(No Model.) 2 Sheets—Sheet 2.
F. HIGBIE.
LAMP STOVE AND ATTACHMENT THEREFOR.
No. 495,802. Patented Apr. 18, 1893.
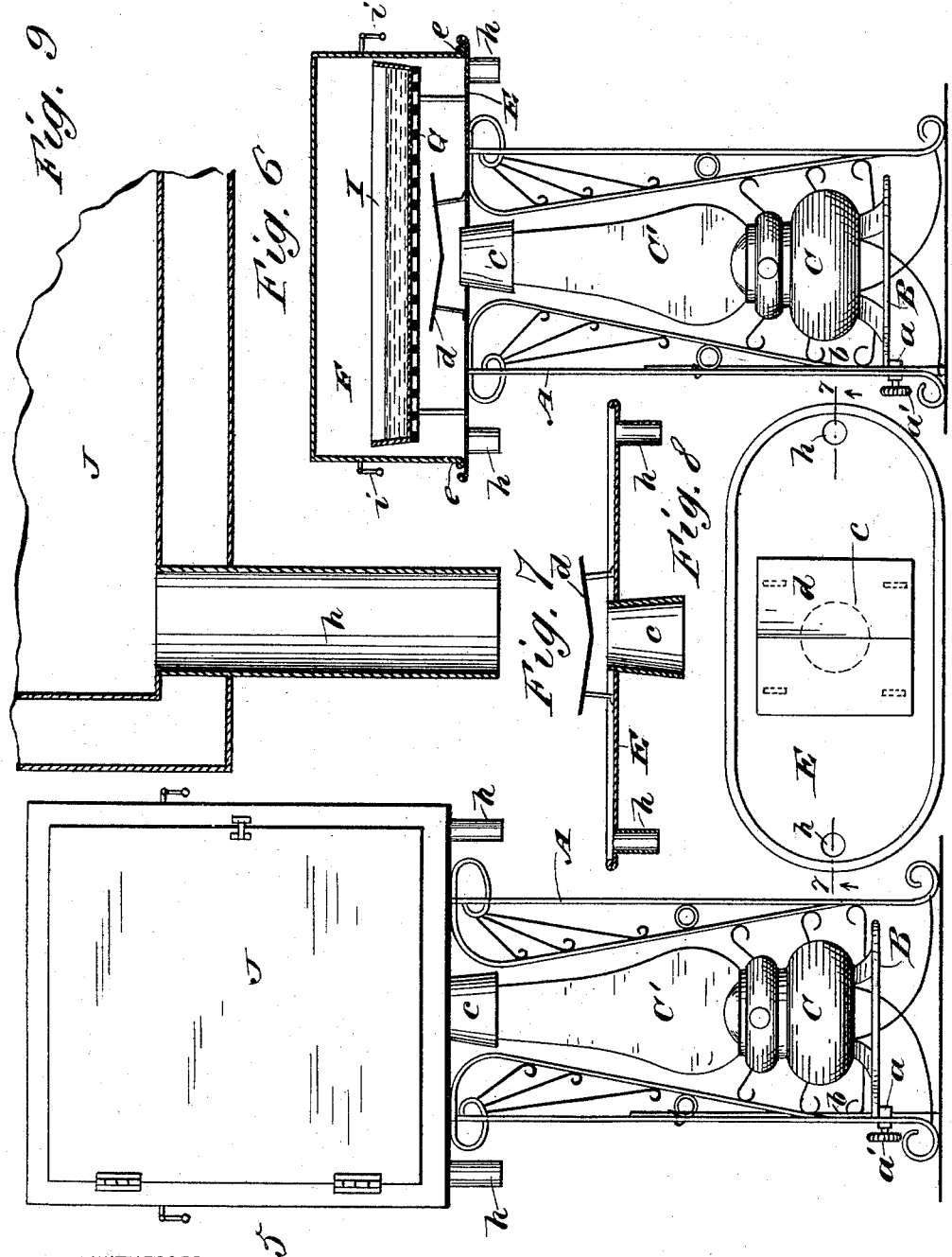
WITNESSES:
C. Neveux
C. Sedgwick
INVENTOR
F. Higbie
BY Munn & Co
ATTORNEYS.

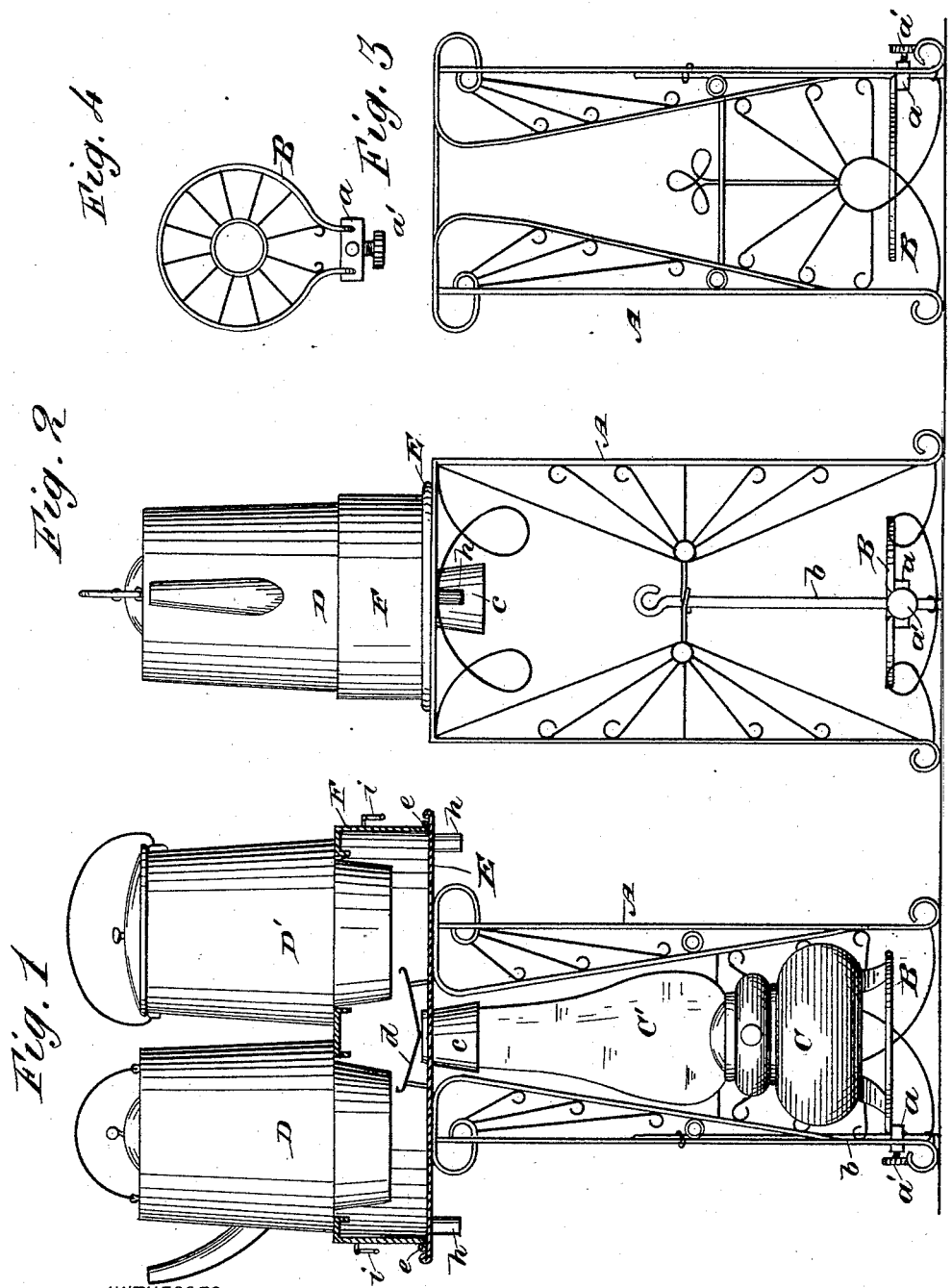

UNITED STATES PATENT OFFICE.

FRANCES HIGBIE, OF BROOKLYN, NEW YORK.

LAMP-STOVE AND ATTACHMENT THEREFOR.

SPECIFICATION forming part of Letters Patent No. 495,802, dated April 18, 1893.

Application filed August 26, 1892. Serial No. 444,177. (No model.)

*To all whom it may concern:*

Be it known that I, FRANCES HIGBIE, of Brooklyn, in the county of Kings and State of New York, have invented a new and useful Lamp-Stove and Attachments Therefor, of which the following is a full, clear, and exact description.

This invention relates to improvements in portable stoves for cooking and like purposes;
and has for its object to provide a novel stove and appurtenances therefor, which will be adapted to utilize the heat produced by combustion of a liquid illuminant in one or more lamps, for cooking and baking purposes, as well as for warming of rooms, if desired.

To this end, my invention consists in the peculiar construction and combination of parts, as is hereinafter described and claimed.

Reference is to be had to the accompanying drawings forming a part of this specification, in which similar letters of reference indicate corresponding parts in all the figures.

Figure 1 is a front view of the stove, and a sectional view of an appliance therefor adapted to support liquid holding receptacles in position to receive heat from the stove. Fig. 2 is an end view of the stove and devices shown in Fig. 1, with the heating device removed. Fig. 3 is a rear view of the stove frame, with other parts removed. Fig. 4 is a detached top view of the lamp supporting bracket frame. Fig. 5 is a front view of the stove frame and lamp therefor, and an oven in position on the frame. Fig. 6 is a front view of the stove frame, a lamp in position thereon, and devices partly in section that rest on the frame, receive heat from the lamp, and are adapted to utilize the heat for baking, broiling, or frying purposes. Fig. 7 is a view in longitudinal section, taken on the line 7—7 in Fig. 8, showing the construction of an essential part of the stove. Fig. 8 is a top view of the part shown in Fig. 7; and Fig. 9 is an enlarged, broken side view in section, of the oven shown in Fig. 5.

As before indicated, this novel device is designed to conserve the heat evolved by combustion of oil or like material in a lamp having a transparent chimney, ordinarily used for illuminating purposes, and store the waste heat in suitable adjunctive appliances conveniently arranged to allow food articles to be cooked, or baked, as occasion may require.

Referring to the drawings, the stove proper consists of a light frame A, preferably made of metal in ornamental design, and is substantially rectangular, having sides and end walls or portions all produced from wire rods in skeleton form. There is a bracket frame B, by preference made of wire rod material, flat on its sides and circular in contour, as represented in Fig. 4, which frame is intended to serve as a base for the support of an ordinary illuminating lamp C, and for efficiency in service it is essential that the bracket frame be vertically adjustable.

A preferred means for securing the bracket frame B in a horizontal position on the stove frame A, consists of a clamping block *a*, on the part B, near its edge, which is perforated at a right angle to the flat sides of the latter, and provided with a binding screw *a'*.

The frame A, has a removable rod-like standard *b*, attached to one side near the center of length, as shown in Fig. 2, which standard being of such a diameter as will allow it to slide within the perforation of the block *a*, serves as a support for the bracket frame B, which may be adjusted on it at any desired height.

Upon the top of the stove frame A, there is a flat piece E imposed when the stove is to be used for heating liquids or boiling food material in proper receptacles such as D, D', in Fig. 1. The plate E is made of sheet metal, preferably shaped edgewise as shown in Fig. 8, and is wired on the edge to stiffen it. This piece is to be regarded as a part of the stove, although removable from the frame A, and has a depending, short, flaring heat-conducting flue *c*, secured at its center. The upwardly tapered flue *c* receives the upper end portion of a glass lamp chimney C', when it and the lamp C, are placed below and supported by the bracket frame B, so that heat evolved from combustion of an illuminant in the lamp will be conducted through the flue *c* above the part E, which for convenience is termed a base-plate. The upper part of the flue *c* is projected slightly above the plate it is secured to, so as to protect the lamp chimney, as will be further explained, and above the flue a heat deflector plate $d$ is supported by legs or equivalent means.

There is a heat holder F provided, which is simply a pan-like structure having its side wall of a height best adapted for the intended service, and shaped as to contour so as to permit it to be seated on the base plate E, when inverted, its dimensions being such as will adapt its free wired edge $e$ to rest near the edge of the base plate, see Figs. 1 and 6. When the heat holder F is intended to receive vessels such as D, D', proper sized apertures are formed in its top plate for their introduction and support, see Fig. 1, which will sustain the vessels' bottoms near to the deflector plate $d$, so that heat from the flue $c$ will be directed against the parts of the liquid-holding receptacles mentioned.

As it is necessary to provide for draft in the lamp chimney C', perforations are formed in the base plate E, near its ends, and properly spaced apart. Usually two of these outlets are sufficient, and within them short pipes $h$ are affixed by one end of each, so as to allow the latter to depend from the lower side of the base plate of an equal length. It will be evident that the products of combustion and any odor or unconsumed gaseous exhalations from the lamp C, will be drawn directly toward the tubular discharge pipes $h$, while the major portion of the heat therefrom will be diffused throughout the holder F.

As shown in Fig. 6, the holder F may have its top plate imperforate and thus become practically a heat retainer in which articles of food may be baked, or others such as meats may be broiled by the action of heat currents from the lamp C.

To facilitate the broiling and baking operations, a gridiron G may be utilized, which being supported by its legs a proper distance above the deflector plate $d$, is adapted to sustain a bake pan I, or the gridiron may be employed alone to broil meat upon, the plate $d$ over the upper projecting end of the flue $c$, preventing drippings from passing down said flue. As the volume of heat may be measurably controlled in production by an adjustment of the lamp flame, within a practical range, the heating of the interior of the holder F, may thus be graduated to suit the cooking or baking operation while it is in progress. Cooked articles of food may also be kept warm within the holder F, or by placing their containing vessels on the top of the heat holder.

Handles $i$ are secured on the ends of the heat holder F, to enable an operator to place or remove it readily, and in case it is necessary to frequently supervise the cooking operation, the holder may be lifted off with ease.

When loaves of bread or form cakes are to be baked, an oven like J, may be substituted for the heat holder F, it being a more capacious structure furnished with a door, and preferably made with double walls having an air space between, as indicated in Fig. 9, and also provided with the outlet pipes $h$, that are in this case four in number, one located at each corner on the bottom wall of the oven and penetrating to its interior, the base plate E being removed when the oven J is in use.

As before mentioned, the device with the heat holder in service may be used to heat small rooms when this is needed, which will be a matter of great convenience if other means for heating the room are not furnished or available at the time heat is needed.

By multiplication of parts and an increase in size of the same, large inclosed spaces such as apartments and buildings may be heated in the manner described; but the preferred use for the stove and adjuncts for the same that have been described, is the cooking or baking of food articles while the lamp that furnishes the heat for such an operation is available for illumination of the apartment.

Having thus described my invention, I claim as new and desire to secure by Letters Patent—

1. A lamp stove, comprising a supporting frame and a plate provided with an opening and having a depending tapering flange, said opening to receive the upper end of an ordinary lamp chimney, a vertical rod on the frame and a shelf movable vertically on the said rod and provided with a set screw whereby the lamp may be held with its chimney in said flange or lowered for removal from the shelf, substantially as set forth.

2. A lamp stove, comprising an open work frame A, provided with an apertured top plate having a conical flange $c$ and depending draft flues $h$, a heat holder mounted on the said top plate, and a vertically adjustable lamp shelf B, mounted on the frame below the flange $c$, substantially as set forth.

FRANCES HIGBIE.

Witnesses:
 WM. P. PATTON,
 C. SEDGWICK.